(12) United States Patent
Ravan et al.

(10) Patent No.: US 11,841,043 B2
(45) Date of Patent: Dec. 12, 2023

(54) LOCKABLE ADJUSTABLE STANDOFF

(71) Applicant: Euro Ornamental Forgings Inc., Woodbridge (CA)

(72) Inventors: Ali Ravan, Woodbridge (CA); Henry Mercieca, Woodbridge (CA)

( * ) Notice: Subject to any disclaimer, the term of this patent is extended or adjusted under 35 U.S.C. 154(b) by 221 days.

(21) Appl. No.: 17/493,038

(22) Filed: Oct. 4, 2021

(65) Prior Publication Data
US 2023/0108878 A1 Apr. 6, 2023

(51) Int. Cl.
| F16B 21/00 | (2006.01) |
| F16B 35/00 | (2006.01) |
| F16B 23/00 | (2006.01) |
| F16B 5/02  | (2006.01) |

(52) U.S. Cl.
CPC .............. *F16B 35/005* (2013.01); *F16B 5/02* (2013.01); *F16B 23/0061* (2013.01)

(58) Field of Classification Search
CPC ....... F16B 35/005; F16B 5/02; F16B 23/0061
USPC .............................................. 411/338; 52/511
See application file for complete search history.

(56) References Cited

U.S. PATENT DOCUMENTS

| 5,280,690 A * | 1/1994 | Hu ...................... E04F 13/0855 52/511 |
| 5,697,592 A * | 12/1997 | Matheny ................ A47K 10/04 248/231.91 |
| 6,470,612 B1 * | 10/2002 | Pountney .................. G09F 7/18 40/607.13 |
| 6,991,414 B1 * | 1/2006 | Mensah ................ F16B 37/145 411/338 |
| 9,970,196 B1 * | 5/2018 | Mao-Cheia ........... E04F 13/145 |
| 10,228,003 B2 * | 3/2019 | Nipper ...................... F16B 5/02 |
| 2002/0028107 A1 * | 3/2002 | Craig ........................ F16B 5/02 403/280 |
| 2004/0032059 A1 * | 2/2004 | Babin ................. B29C 45/2806 425/564 |
| 2004/0265090 A1 * | 12/2004 | Stone .................... F16B 5/0233 411/338 |
| 2009/0199452 A1 * | 8/2009 | Huber ....................... F41G 1/38 42/125 |
| 2011/0187247 A1 * | 8/2011 | Carter .................... A47B 46/00 312/246 |
| 2016/0121812 A1 * | 5/2016 | Avalos Sartorio ... B62D 27/065 29/464 |
| 2018/0298936 A1 * | 10/2018 | Bräutigam ........... B60Q 1/0686 |

* cited by examiner

*Primary Examiner* — Gary W Estremsky
(74) *Attorney, Agent, or Firm* — Nasser Ashgriz; UIPatent Inc.

(57) ABSTRACT

The present invention is an adjustable connector with hidden threads for securing and adjusting a glass panel to a structure. The connector has an internally threaded retainer mounted on a fastener which is secured by a fastener and receives an externally threaded telescope. A nut shape lock installed inside the telescope to lock the telescope. By turning the lock, it moves towards the fastener and locks the telescope by pushing the fastener. The lock is a security feature to hold the adjustable standoff in adjusted position and prevents unscrewing the telescope once the cap is uninstalled. The telescope and retainer are threaded internally which are not exposed.

4 Claims, 10 Drawing Sheets

LOCKABLE ADJUSTABLE STANDOFF

FIELD OF THE INVENTION

The present invention relates in general to connectors, and in specific to connecters to install and secure the glass railings.

BACKGROUND OF THE INVENTION

Connectors have been developed for attaching panels to a structure. Connectors for glass panels and glass railings can be used along an elevated level or a stairway to support glass panels as a guard. These connectors are usually referred to as standoffs installed on the substrate by fasteners. Glass panels are attached to the standoffs through a hole to be secured by caps which are threaded into the central holes of the standoffs. It is important that the glass panels are installed so that they are plumb and in line with one another.

In general, a conventional standoff typically includes a spacer attaching to the given support structure on one end, and a cap that has a threaded rod configured to twist inside on opposing end of the spacer. Unfortunately, conventional standoffs suffer from a number of drawbacks.

There are different types of adjustable standoffs in the market. Spacer of the adjustable standoffs includes two parts treaded together to form a telescope. These threads could be exposed or hidden. A model comes with a locking mechanism for the telescope in order to fix the telescope after adjustment. The locking mechanism secures the telescope from moving once the cap is tightened or from loosening when the cap is unscrewed. Available models with locking mechanism come with exposed threads for the telescope which is a drawback. Exposing threads are considered a disadvantage for this design which does not look good.

The adjustable standoffs with hidden threads which are more popular come without locking mechanism which is considered as a safety feature. In the installation of the glass panels, when the cap is installed, it could turn the telescope which causes misadjusting the standoff or when the cap is disassembled, could release the telescope and fall down. Therefore, there is a need for an improved standoff which provides both appealing look and safety features together. The present invention provides locking mechanism for adjustable standoffs designed with hidden threads.

SUMMARY OF THE INVENTION

According to one embodiment of the present invention, a connecting mechanism to secure the glass railings is disclosed. The connecting mechanism is an adjustable standoff which includes an internally threaded retainer secured to a support structure by a fastener to receive a telescope to form an adjustable spacer. The telescope comes with an internal lock as a security feature to keep the telescope secured in an adjusted position.

The lock member is an externally threaded round piece placed inside the telescope. By turning the lock clockwise through its central socket, it moves toward the fastener and presses the fastener's head. As a result, the telescope is pushed back and locked inside the retainer. The adjustable standoff includes a cap with a threaded rod which passes through the hole of the glass panel and to be secured to the telescope. Once the standoffs are installed, by adjusting the length of the telescope, the glass panels can tilt in and out to be aligned with adjacent panels.

To adjust the telescope, the cap is removed and a socket tool is passed through the central hole of the telescope to access the socket of the lock and releases the lock. Next, the telescope is turned by a tool through its central socket to be adjusted. Again, the socket tool is used to turn and engage the lock. Finally, the cap is fastened to secure the glass panel.

An important feature of the present invention resides in the locking mechanism to prevent unscrewing the telescope once the cap is turned to be removed. The lock presses the head of the fastener to push back the telescope to lock. Once the cap is installed, the locking mechanism holds the telescope in adjusted position. The retainer is threaded internally therefore there is no threads exposed.

It is therefore an object of the present disclosure, to provide a standoff mechanism to easily, quickly and securely mount a glass panel and provide safe and secure installation and maintenance for the installers.

It is another object of the present invention to provide an improved standoff which has aesthetic look combined with safety feature to hold the glass panel as a guard.

It is another object of the present invention to provide a standoff with locking mechanism as a security feature to prevent unscrewing the telescope once the cap is turned to be removed for adjustment of the panel.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
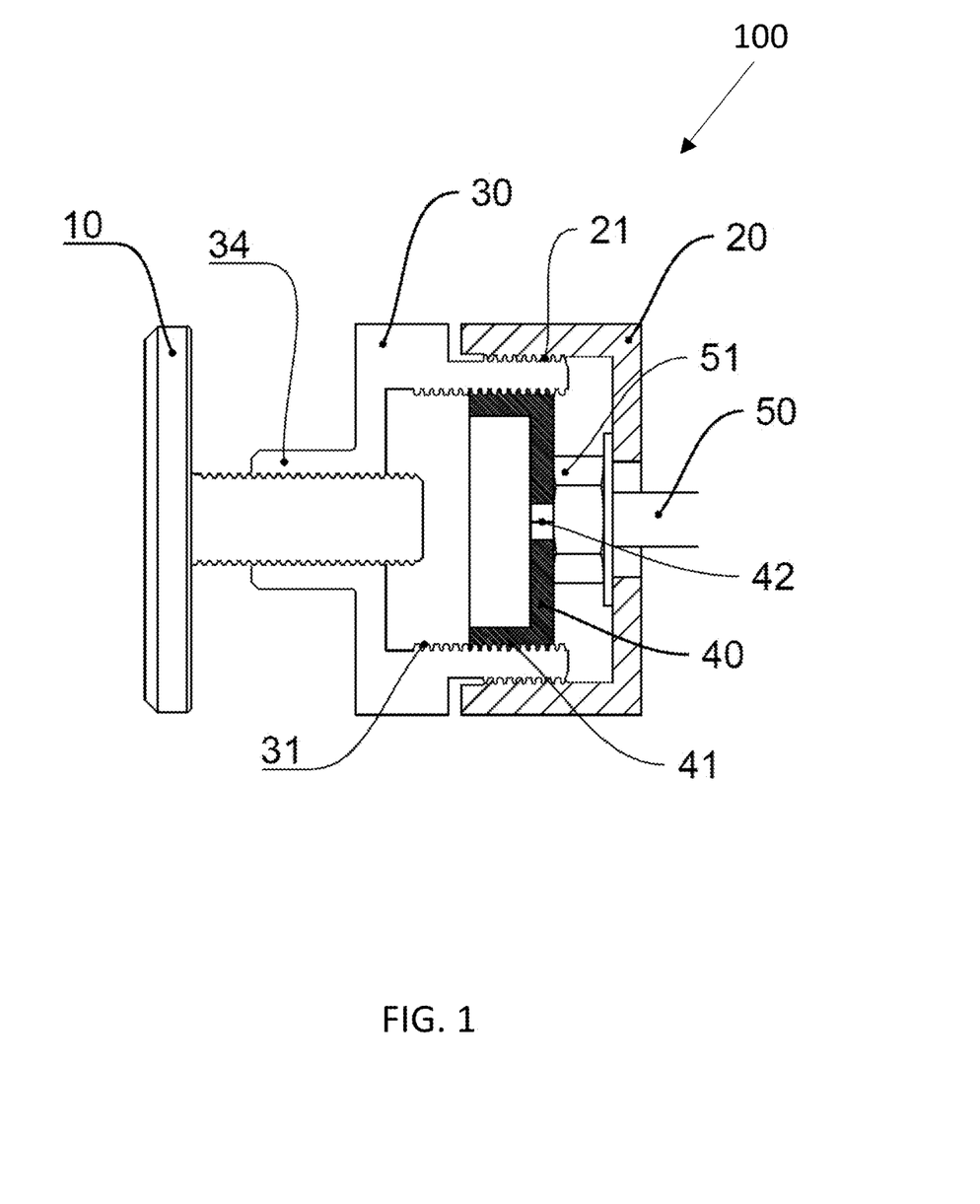
FIG. 1 is a cross-sectional view of the lockable and adjustable standoff according to one embodiment of the present invention.
Figure 2:
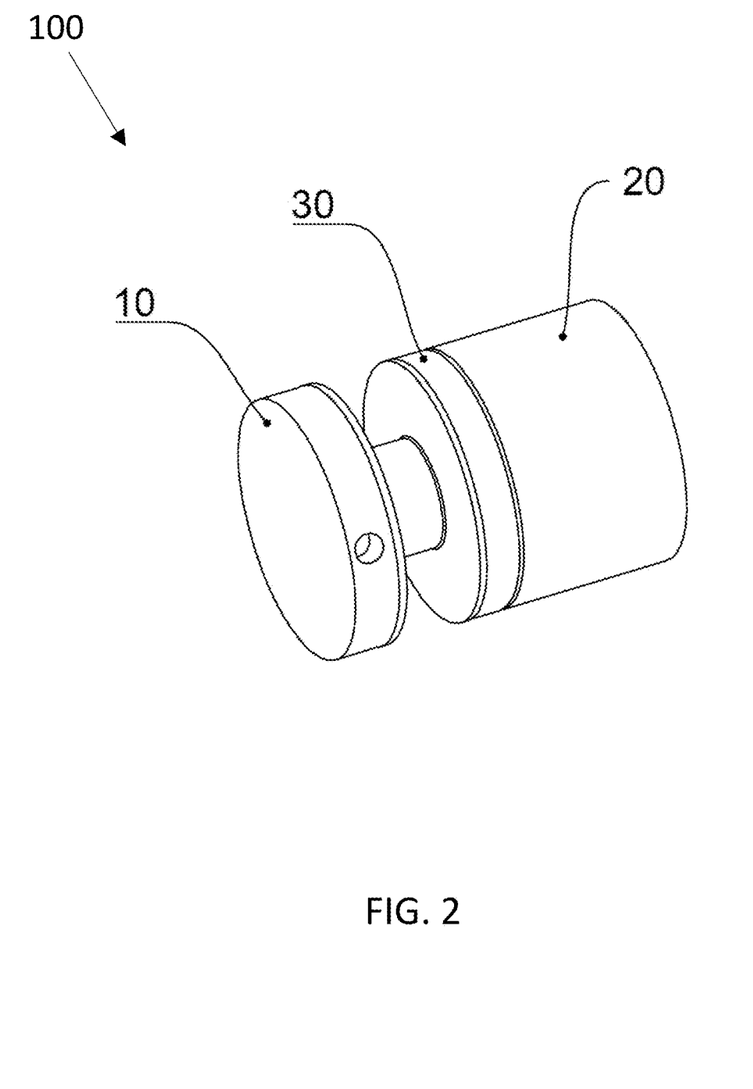
FIG. 2 is a perspective view of the assembled standoff according to the present invention.
Figure 3:
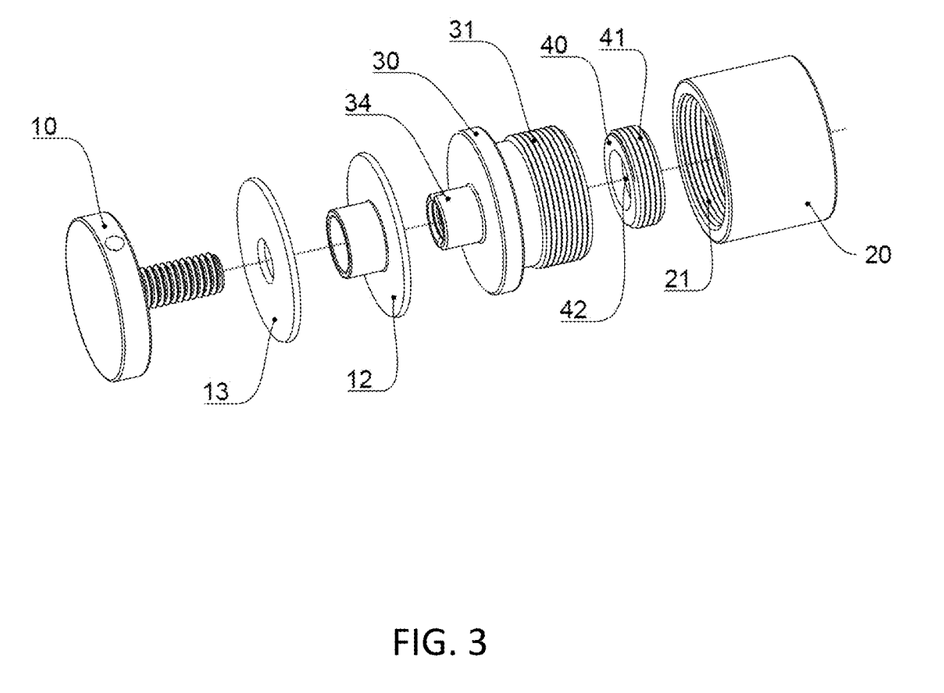
FIG. 3 is an exploded view of the components of the standoff according to the present invention.

Referring now to FIGS. 1, 2 and 3, there is shown one preferred embodiment of a standoff assembly 100 in accordance with the invention installable on a structure to secure a glass panel or a glass railing to the surface of a structure. The standoff provides telescopic mechanism with lock. Telescopic mechanism provides adjustment for the standoff to be flexible in length. The standoff assembly includes cap portion 10 to secure the glass panel.

The standoff assembly 100 has a retainer 20 secured to a structure by a fastener 50. The retainer 20 is a cylindrical hollow shape structure internally threaded 21 so there is no thread exposed.

The standoff assembly 100 provides a telescopic mechanism 30 with security feature to hold the telescope 30 in an adjusted position and to prevent unscrewing the telescope 30 once the cap 10 is turned to be removed. The telescope 30 has external threads 31 to secure to the retainer 20. The telescope 30 further has a protruded portion 34 adapted and sized to receive a panel.

An externally threaded lock 40 is installed inside the telescope 30 for security features. The telescope 30 together with the lock 40 are screwed on the retainer 20. By turning the lock 40 clockwise through its central socket 42, it moves toward the fastener 50 and presses the fastener's head 51. As a result, the telescope 30 is pushed back and locked inside the retainer 20. The external threads of the lock assembly 41 are fully threaded and secured inside the threads of the telescope 31. Lock 40 is turned by a socket tool through its central socket 42 to move inward and presses the head of the fastener 51 and makes the telescope 30 fully secured in an adjusted position. The lock 40 makes the standoff safe once the cap 10 is removed by preventing the telescope 30 to be unscrewed. Once the cap 10 is installed, the lock 40 holds the telescope 30 in an adjusted position.

According to FIG. 2 an important feature of the present invention resides in the locking mechanism for standoff coming without threads exposed. All threads are cut inside the retainer and outside the telescope.

In installation, the retainer 20 is secured on the structure and the telescope 30 is threaded into the retainer 20. Then, the lock 40 is turned to push against the head of the fastener 51 to make the telescope 30 tight and secure. The first gasket 12 (As shown in FIG. 3) is slid over the telescope 30, after which a glass panel is mounted on a structure. Then the cap 10 and gasket 13 are inserted and tightened in place to compress the glass panel between the gaskets 12 and 13. The gaskets may be selected from silicone, rubber, a pliable plastic, felt, nylon, wood or other material.

The glass panel can be aligned in a secure manner. To align the glass panel, the cap 10 is removed first. Then, a socket tool is passed through the central hole of the telescope to access the central socket 42 to release the lock 40. Next, the telescope 30 is turned by a tool to be adjusted. Again, a socket tool is used to turn and engage the lock 40. Finally, the cap 10 is fastened to secure the glass panel.

Figure 4:
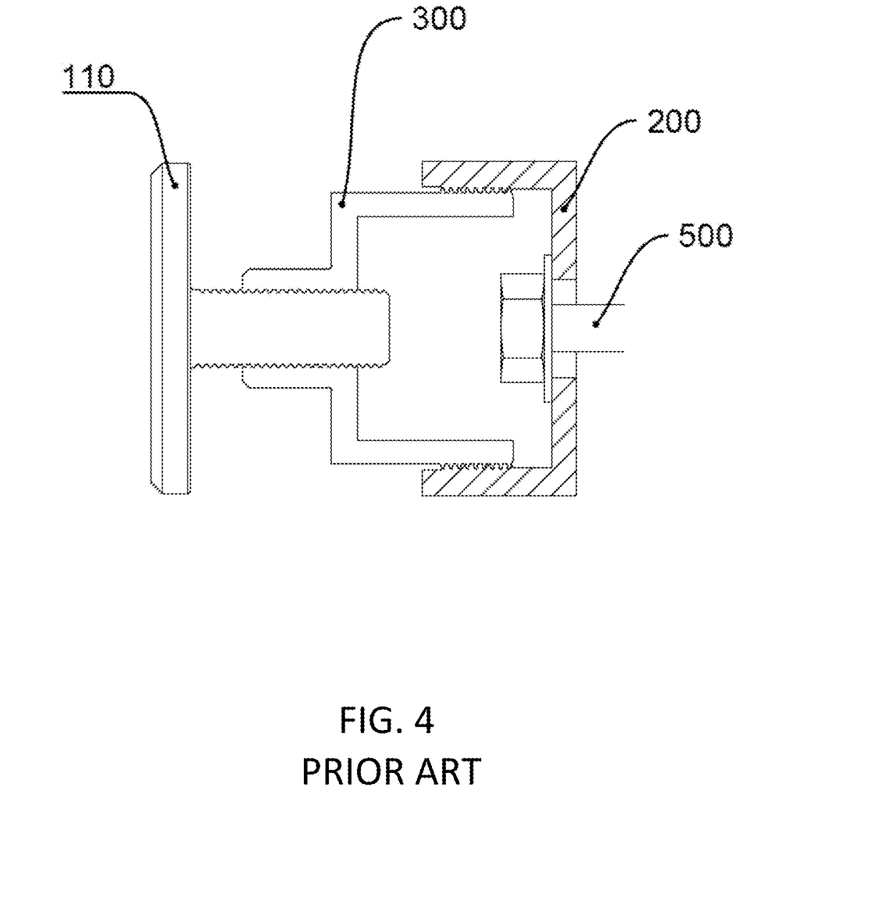
FIG. 4 is a cross-sectional view showing a prior art standoff assembly.

There are different types of adjustable standoffs in the market but those with lock come with exposed threads. Adjustable standoffs with hidden threads which are more popular come without locking mechanism which is considered as a safety feature. According to FIGS. 4 and 5 two available standoffs are disclosed. Both designs provide telescoping mechanism to adjust the length of the standoff. One of these standoffs depicted in FIG. 4 is without lock in which retainer 200 is secured by the fastener 500 and the telescope 300 is treaded externally and once is turned it goes in or out into the retainer 200.

Figure 5:
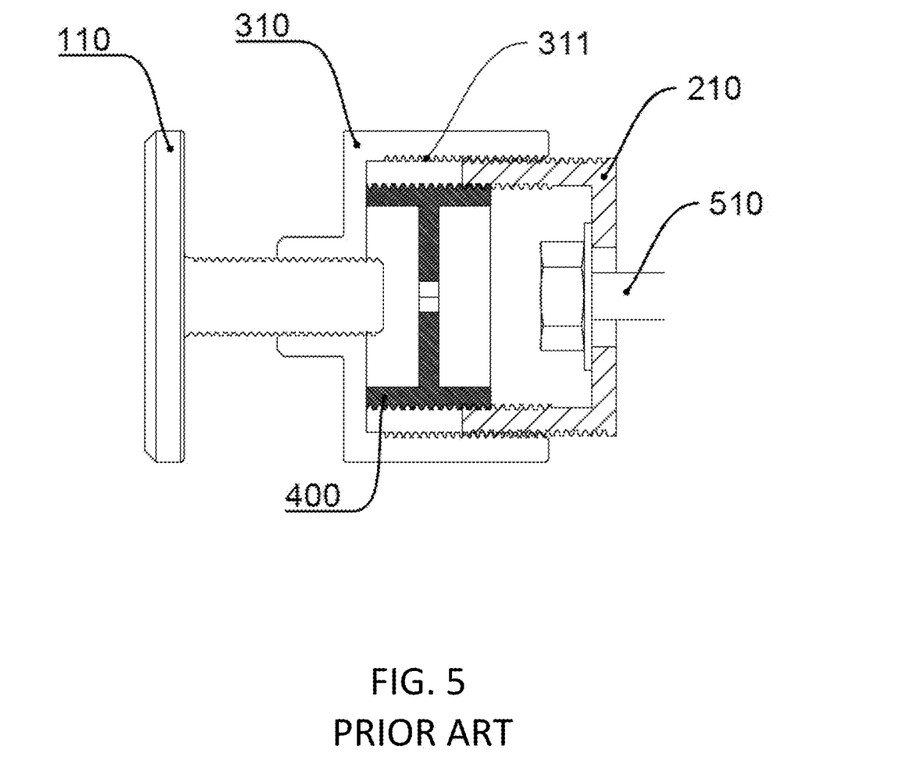
FIG. 5 is a cross-sectional view showing another prior art standoff assembly.

FIG. 5 shows an adjustable standoff with lock 400 in addition to the telescoping mechanism 310. The telescope 310 is threaded 311 on the outside of the retainer 210. Lock 400 goes inside the retainer 210 and it is turned by a key through central socket to push against inside surface of the telescope to be secured. External threads of retainer 311 are exposed when the standoff extends. Exposing threads 311 is a disadvantage for this design.

As explained above, the first design comes without the lock which is considered as a safety and security feature in glass panels installation. When the cap 110 is installed, it might turn the telescope 300 which causes misadjusting the standoff. When the cap 110 is disassembled it might unscrew the telescope 300 and fall down. The second design is not popular due to exposed threads 311.

Figure 6A:
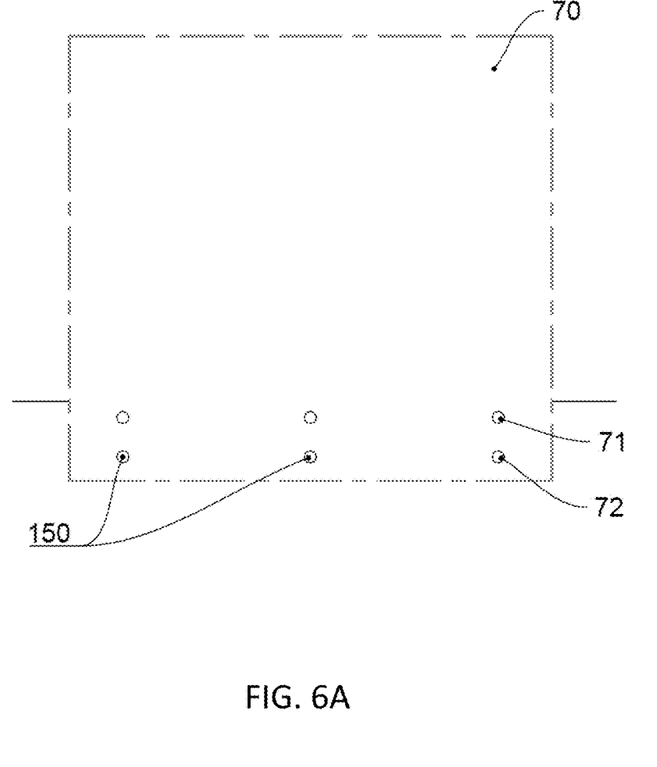
FIG. 6A is a front view of a glass panel showing the installation of the glass panel using the standoff assembly of the present invention.
Figure 6B:
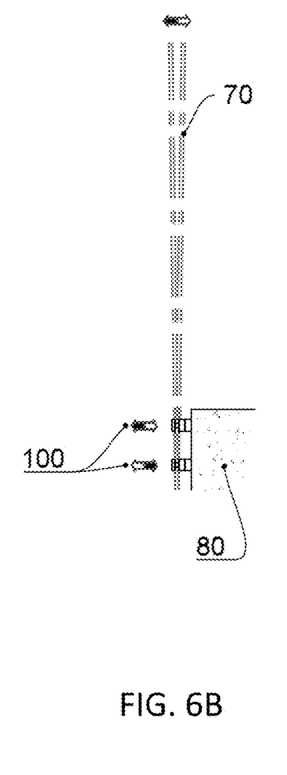
FIG. 6B is a side view of a glass panel being mounted to a support structure using the standoff assembly of the present invention.
Figure 6C:
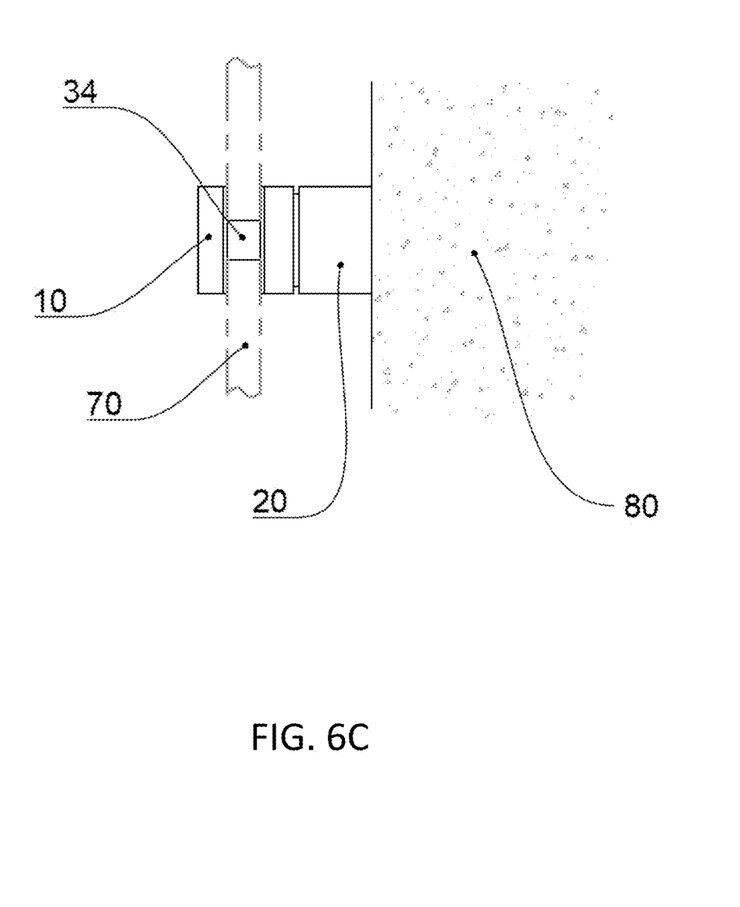
FIG. 6C is a side view of a glass panel being mounted to a support structure using the standoff assembly of the present invention.

FIGS. 6A, 6B and 6C disclose the installation of the standoff in accordance with the present invention 100. FIG. 6A is a front view of a rectangular glass panel 70. Panels of this type are generally made of strong, thick glass in order that they are strong enough to serve the desired purpose. For example, tempered glass with more than ½ inches thickness is generally used as glass balustrades. Such panels can also be mounted along a mezzanine, a roof, or a stairway.

FIG. 6B shows a side view of the glass panel 70. It is common to mount these panels by two rows of standoffs 100 including an upper row 71 and a lower row 72. The details of the standoff 100 can be seen more clearly in FIG. 6C in which the standoff 100 is shown in side view. In these figures standoffs 100 are used to secure a glass panel 70 to a support structure 80.

In installation the retainer 20 of the standoff 100 is fastened to a plurality of fasteners secured on a structure 80. The glass panel 70 further includes bores 150 there through that act as mounting openings and that align with the internally threaded protruded portion 34 of the telescope adapted and sized for insertion of the mounting opening of the panel 70. Each of the retainers 20 is being received by a respective fastener and then the telescope 30 together with the lock 40 are screwed on the retainer 20. The first gasket 12 is attached to the telescope 30. Then, the glass panel 70 is mounted on the protruded portion 34 of the telescope. The second gasket 13 is then slid over the glass panel 70 and secured by the cap 10.

The described structure will provide a mechanism to easily, quickly and securely mount a glass panel 70 to a support structure 80 and adjusted in place without removing in a secure manner. The adjustable standoff 100 is able to extend or to shorten in length. When the installed glass panel 70 requires an adjustment, the cap 10 is removed. A socket tool is extended to reach the central socket 42 of the lock 40 to be released. While the panel 70 is on the adjustable standoff, the telescope 30 is turned by a socket tool to adjust and tilt the panel 70 consequently. Once adjustment is complete, the lock 40 is turned back again to press the head of the fastener 51 and secure the telescope 30 in adjusted position. Finally, the cap 10 is installed to secure the panel 70 in position.

Figure 7A:
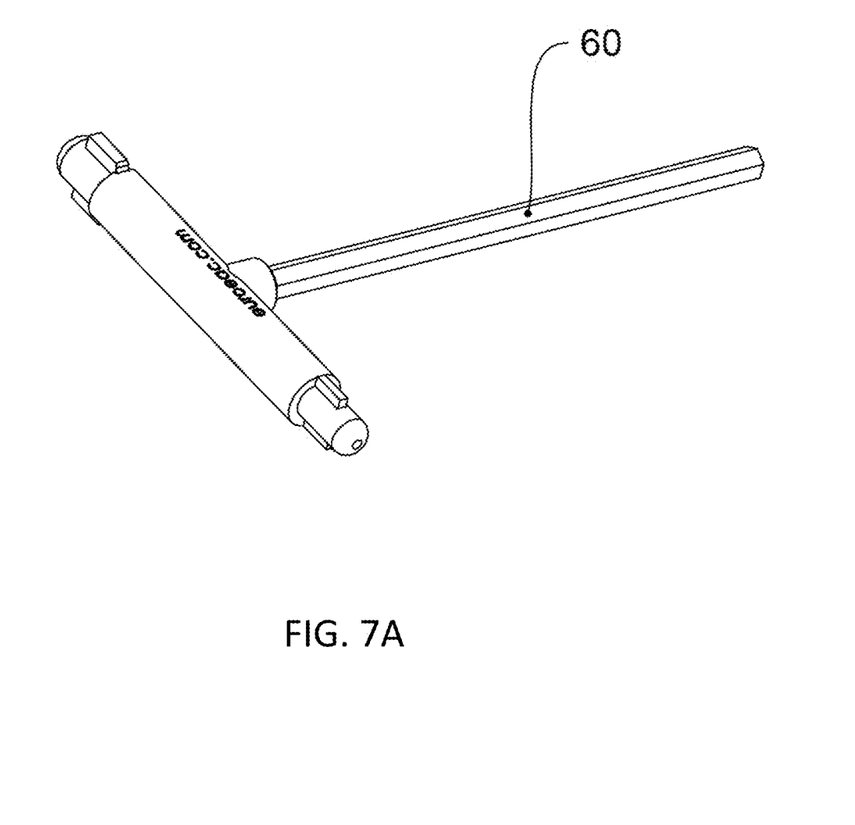
FIG. 7A shows the T-shape tool for installation of the standoff assembly of the present invention.
Figure 7B:
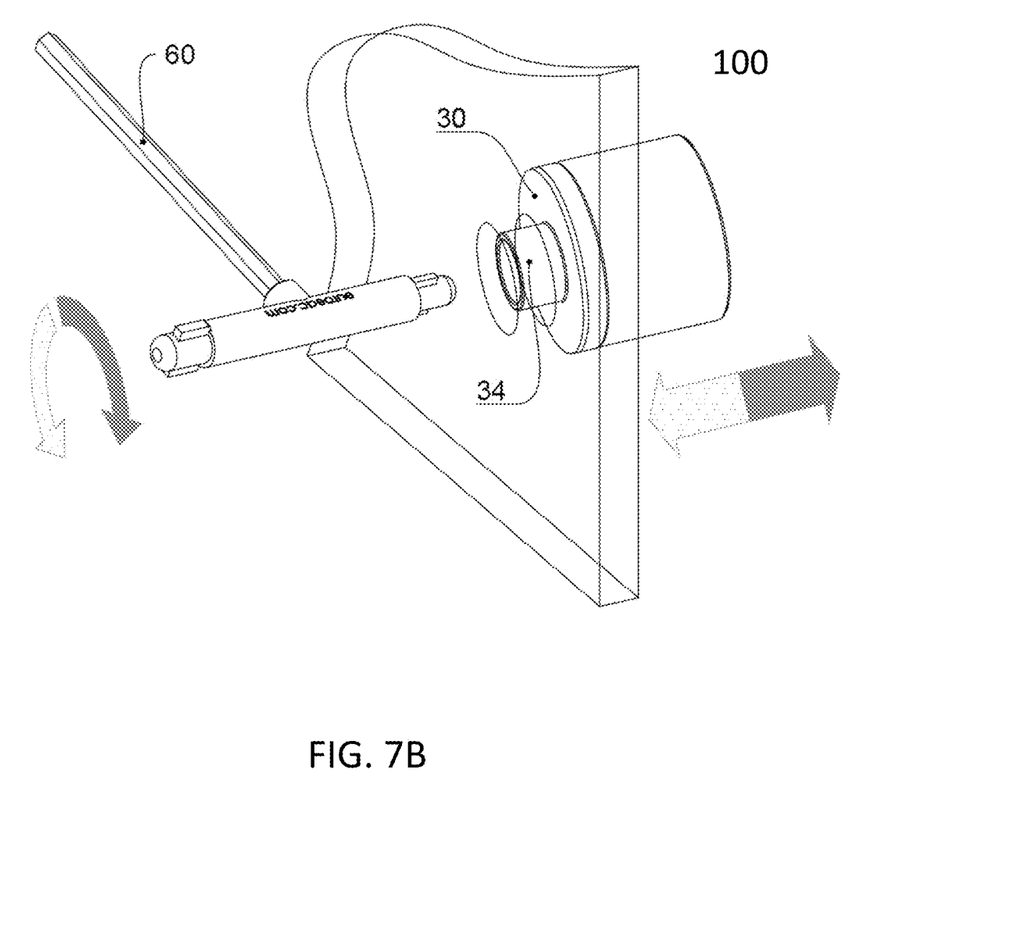
FIG. 7B shows the T-shape tool for adjusting the telescope of the standoff assembly of the present invention.
Figure 7C:
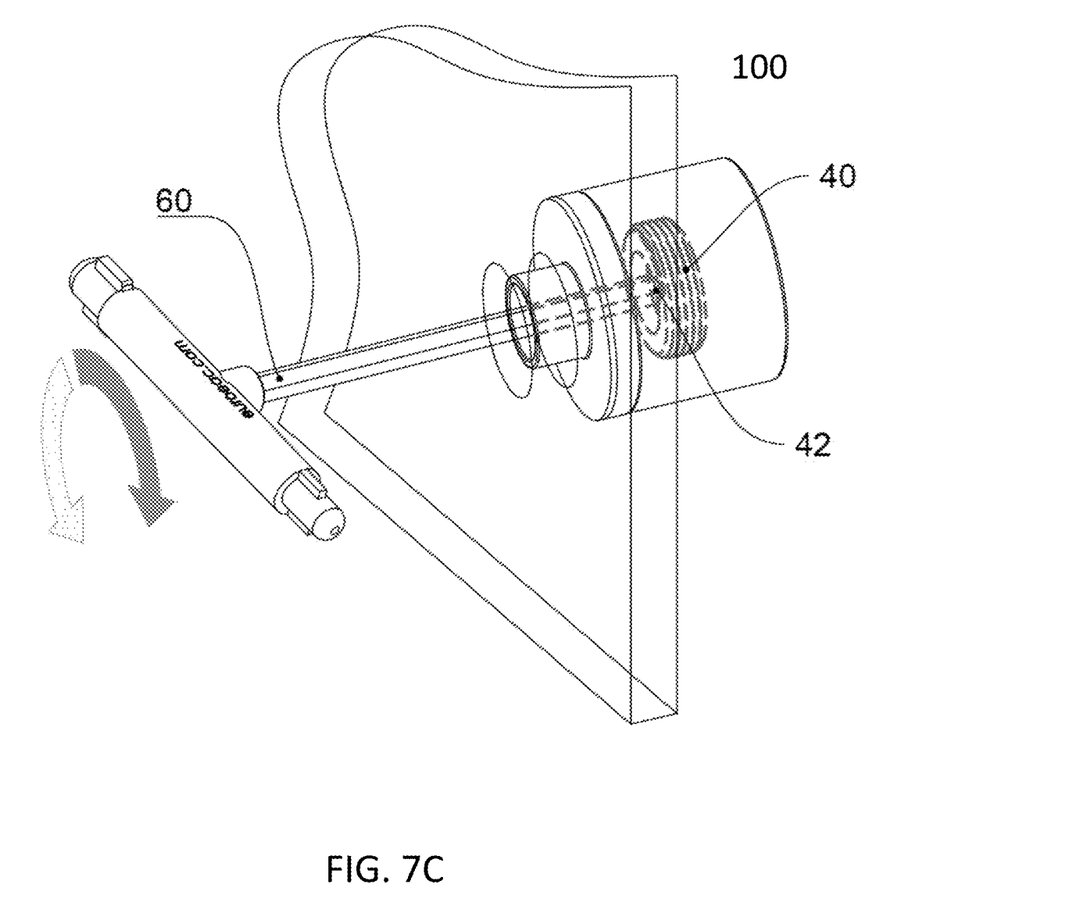
FIG. 7C shows the T-shape tool for securing the lock of the standoff assembly of the present invention.

As shown in FIGS. 8A, 8B and 8C in installation steps, a T-shape tool is used to turn the lock 40 and telescope 30 according to the present invention. The T-shape tool 60 drives into the central socket 42 of the lock and turns the lock clockwise. The central socket 42 could be in any shape including but not limited to hexagonal, slot or square to be turned by the T-shape tool 60. The T-shape tool 60 is used to turn the telescope 30 through the protruded portion 34 for adjustment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. An adjustable standoff for securing and adjusting a panel to a structure in place, in said adjustable standoff comprising:
   i. an internally threaded retainer mounted by a fastener on a structure;
   ii. an externally threaded telescope having an internally threaded protruded portion, and an externally threaded lock installed inside the internally threaded telescope, wherein the externally threaded telescope together with the externally threaded lock are screwed on the internally threaded retainer, and wherein the internally threaded protruded portion is adapted and sized for insertion through a mounting opening in said panel, and
   iii. a cap threaded into the internally threaded protruded portion,
   whereby a position of the panel can be adjusted after mounting by a driver to attach to the feature of the protruded portion of the telescope and turn it while the panel is on the adjustable standoffs, thereby adjusting said externally threaded telescope in said internally threaded retainer to adjust the panel, and
   whereby the externally threaded lock pushes against a head of the fastener, thereby pushing back the externally threaded telescope, keeping the panel in a tight and secure position.

2. The adjustable standoff of claim 1, further having a first gasket being adapted and sized for position about said internally threaded protruded portion between said externally threaded telescope and said panel.

3. The adjustable standoff of claim 1, further having a second gasket positioned about said panel; wherein said panel is hold secure in between said first and said second gaskets.

4. The adjustable standoff of claim 1, wherein the panel is a glass panel.

* * * * *